United States Patent
Bruestle (10) Patent No.: US 10,220,927 B2
(45) Date of Patent: Mar. 5, 2019

(54) OUTBOARD MOTOR, COMPRISING AN INTERNAL COMBUSTION ENGINE

(71) Applicant: Neander Motors AG, Kiel (DE)

(72) Inventor: Claus Bruestle, Nordheim (DE)

(73) Assignee: Neander Motors AG, Kiel (DE)

( * ) Notice: Subject to any disclaimer, the term of this patent is extended or adjusted under 35 U.S.C. 154(b) by 0 days.

(21) Appl. No.: 15/491,753

(22) Filed: Apr. 19, 2017

(65) Prior Publication Data

US 2017/0305518 A1    Oct. 26, 2017

(30) Foreign Application Priority Data

Apr. 20, 2016   (DE) .................. 10 2016 004 766

(51) Int. Cl.
  *B63H 20/24*  (2006.01)
  *F02B 61/04*  (2006.01)
  (Continued)

(52) U.S. Cl.
  CPC ........... *B63H 20/24* (2013.01); *B63H 20/001* (2013.01); *B63H 21/14* (2013.01); *F01P 5/06* (2013.01);
  (Continued)

(58) Field of Classification Search
  CPC .. F01P 1/02; F01P 5/06; F01P 2050/12; F04D 29/263; F04D 19/002; F04D 25/02;
  (Continued)

(56) References Cited

U.S. PATENT DOCUMENTS

| 4,692,123 A | 9/1987 | Tada et al. |
| 5,445,547 A | 8/1995 | Furukawa |

(Continued)

FOREIGN PATENT DOCUMENTS

| DE | 102 05 109 A1 | 9/2002 |
| DE | 10 2012 015 907 B3 | 10/2013 |

(Continued)

OTHER PUBLICATIONS

German-language Office Action issued in counterpart German Application No. 10 2016 004 766.6 dated Mar. 2, 2017 (eight (8) pages).

(Continued)

*Primary Examiner* — Anthony D Wiest
(74) *Attorney, Agent, or Firm* — Crowell & Moring LLP (57) ABSTRACT

An outboard motor including an internal combustion engine for propelling a ship is equipped with an air-guiding system using a covering hood surrounding surfaces of the internal combustion engine and auxiliary units. The covering hood is provided with airflow inlet and outlet openings in its interior, and a fan driven by the internal combustion engine influences airflows in the covering hood. An air-guiding system includes channeling devices for partial air flows. First partial air flows are fed as intake air to an engine intake system, and second partial air flows act, with the aid of the fan, on surfaces of the internal combustion engine and the auxiliary units heated by operation of the internal combustion engine. The heated airflows are conveyed by the fan and a third channeling device as exhaust air via an outlet opening in the covering hood outside of the covering hood or into the atmosphere.

13 Claims, 8 Drawing Sheets

(51) Int. Cl.
*B63H 20/00* (2006.01)
*B63H 21/14* (2006.01)
*F01P 5/06* (2006.01)
*F02M 35/10* (2006.01)
*F02M 35/16* (2006.01)
*F04D 25/02* (2006.01)
*F04D 29/28* (2006.01)

(52) U.S. Cl.
CPC ..... *F02B 61/045* (2013.01); *F02M 35/10091* (2013.01); *F02M 35/10157* (2013.01); *F02M 35/167* (2013.01); *F04D 25/02* (2013.01); *F04D 29/281* (2013.01); *Y02T 10/144* (2013.01); *Y02T 10/146* (2013.01)

(58) Field of Classification Search
CPC .... F04D 29/281; F02B 75/065; F02B 75/007; F02B 61/045; B63H 20/001; B63H 21/14; B63H 20/24; F02M 35/167; F02M 35/10157; F02M 35/10091; Y02T 10/144; Y02T 10/146
See application file for complete search history.

(56) References Cited

U.S. PATENT DOCUMENTS

| | | |
|---|---|---|
| 6,302,749 B1 | 10/2001 | Tawa et al. |
| 7,299,783 B1 | 11/2007 | Broman et al. |
| 7,806,741 B1 | 10/2010 | Baier et al. |
| 2002/0111088 A1 | 8/2002 | Tsubouchi et al. |
| 2010/0147234 A1 | 6/2010 | Sakata et al. |
| 2014/0041385 A1 | 2/2014 | Wittwer |
| 2016/0032819 A1 | 2/2016 | Bruestle |

FOREIGN PATENT DOCUMENTS

| | | |
|---|---|---|
| DE | 102 05 109 B4 | 3/2015 |
| EP | 2 980 374 A1 | 2/2016 |
| JP | 58-194695 A | 11/1983 |
| JP | 64-8312 A | 1/1989 |
| JP | 10-7087 A | 1/1998 |

OTHER PUBLICATIONS

German-language European Search Report issued in counterpart European Application No. EP 17 00 0549 dated Aug. 27, 2017 (two (2) pages) with partial English translation.

OUTBOARD MOTOR, COMPRISING AN INTERNAL COMBUSTION ENGINE

CROSS REFERENCE TO RELATED APPLICATIONS

This application claims priority under 35 U.S.C. § 119 from German Patent Application No. 10 2016 004 766.6, filed Apr. 20, 2016, the entire disclosure of which is herein expressly incorporated by reference.

BACKGROUND AND SUMMARY OF THE INVENTION

The present invention relates to an outboard motor, comprising an internal combustion engine, for propelling a ship, having an air-guiding system which is effective by way of a covering hood surrounding surfaces of the internal combustion engine and auxiliary units.

An internal combustion engine known from U.S. Pat. No. 6,302,749 B1 operates as an outboard motor for propelling a watercraft. The internal combustion engine is surrounded by a covering hood which delimits an interior. To ventilate and vent the interior, the covering hood, which extensively encases the internal combustion engine, is provided with inlet and outlet devices for airflows moving in the interior and serving to act on housing surfaces of the internal combustion engine. The internal combustion engine comprises a vertical crankshaft, which interacts with a plurality of pistons and which drives balance shafts at an upper end region by way of an endless drive. An alternator with a vertical axis of rotation is provided with a fan, which ventilates and vents the interior of a hood-like endless drive covering.

German document DE 102 05 109 B4 describes an outboard motor provided with a vertically oriented crankshaft and a plurality of auxiliary units mounted on an outer side of a machine housing of the outboard motor. A covering hood encases the outboard motor and the auxiliary units. Air inlet slots are provided on a rear side of the covering hood and interact with an adjoining air-channeling device. The air-channeling device ensures that fresh air is channeled into an upper and a lower region of the interior of the covering hood or to the machine housing and to the auxiliary units.

It is an object of the invention to design an internal combustion engine for an outboard motor for propelling a ship in which an air-guiding system is provided in the interior of a covering hood which surrounds the internal combustion engine. The air-guiding system serves for supplying cooling air and intake air for the internal combustion engine and setting benchmarks in this respect. However, it should also be ensured here that the air-guiding system can be implemented using reasonable means.

According to the invention, this object is achieved by the features claimed. Further features of the invention are set out in dependent claims.

Advantages primarily achieved by the invention are that the air-guiding system of the outboard motor, in conjunction with the internal combustion engine, clad by way of the covering hood, has an exemplary function and is easily implemented. Air flows are channeled in an ingenious manner via an inlet opening in the direction of the interior of the covering hood in such a way that these air flows are separated close to the inlet opening into first partial air flows and second partial air flows. In this context, it should be emphasized that the air-guiding system in the covering hood comprises a first channeling device for the first partial air flows and a second channeling device for second partial air flows. It is advantageous that the first partial air flows are fed as intake air to the intake system of the internal combustion engine and that the second partial air flows act in a cooling manner, with the aid of the fan, on the surfaces of said internal combustion engine and auxiliary units heated by the operation of the internal combustion engine. It is technically favorable here that the air flows heated by the surfaces of the internal combustion engine and the auxiliary units are conveyed by the fan and a third channeling device as exhaust air via an outlet opening in the covering hood to an outer side of the latter or into the atmosphere.

It is structurally simple to realize arranging the inlet opening on the vertical hood wall in the upper end region of the covering hood, with the inlet opening being adjoined by the distributing device, which optimizes the air-guiding system, in the covering hood. By virtue of the distributing device, the first partial air flow and the second partial air flow are guided into the first channeling device and the second channeling device, respectively. By way of example here, the first channeling device forms, with an upper hood portion of the covering hood, a duct region which is connected by an outlet region, The outlet region, for example, may be horizontally oriented, and can have a quadrangular shape and connect to a corresponding inlet region toward the intake system. An ingenious configuration is provided in that, to open the covering hood, the outlet region and the inlet region can be separated from one another, which regions interact with one another with the interposition of an annular sealing body. A noteworthy feature is that the inlet region is connected to a collecting tank which is structurally combined with the compressor of the turbocharger device connected to the intake system.

One feature is a design in which the second partial air flows are channeled via the second channeling device by way of the vertical duct in the direction of the underside of the internal combustion engine and pass from there via the overflow region into the interior of the covering hood, so that the second partial air flows have a heat-reducing influence on the surfaces of the internal combustion engine and of the auxiliary units. As a development here, the duct is formed, on the one hand, by the hood portion of the vertical hood wall and, on the other hand, by boundary portions of the insert of the covering hood. In addition, it is advantageous that the duct region and the insert are connected to the covering hood by adhesive bonding, screwing, or the like.

One feature of the invention is that the fan is driven by way of the vertical crankshaft which projects beyond the upper side of the internal combustion engine. The effect of the air-guiding system is optimized by the fact that, as viewed in the direction of travel of the ship, the inlet opening is arranged adjacent to the rear hood wall and the fan is arranged on the crankshaft close to the front hood wall. The invention is enhanced by the fact that the first crankshaft, which drives the fan forms, together with the second crankshaft, which extends parallel to the first crankshaft, form a crankshaft system of the internal combustion engine in which the crankshafts are in operative connection with at least one reciprocating piston via two connecting rods. The latter is improved by the fact that the crankshafts, which are arranged transversely to the direction of travel on both sides of a center longitudinal plane, have first and second flywheels at their upper ends which project beyond the upper side of the internal combustion engine. The flywheels, as viewed in the vertical direction of the crankshafts, are arranged offset to one another and overlap one another in certain regions, the fan being structurally combined with the upper first flywheel.

Preferably, the first flywheel with fan and the second lower flywheel are covered by a first upper hood portion and a second lower hood portion, respectively, which are formed as a fan-flywheel covering which is produced from one piece or consists of a plurality of parts. In one preferred embodiment, the first hood portion, which dads the fan, is provided with the third channeling device, which has an approximately spiral tangential portion of the fan-flywheel covering. The tangential portion guides the exhaust air conveyed by the fan by way of the outlet opening to the outer side of the covering hood or into the atmosphere. Finally, the fan has an impeller system with mixed flow, radial flow or the like, which can be readily implemented.

BRIEF DESCRIPTION OF THE DRAWINGS

An exemplary embodiment of the invention which is described in more detail below is illustrated in the drawing. Other objects, advantages and novel features of the present invention will become apparent from the following detailed description of one or more preferred embodiments when considered in conjunction with the accompanying drawings.

DETAILED DESCRIPTION OF THE DRAWINGS

Figure 8:
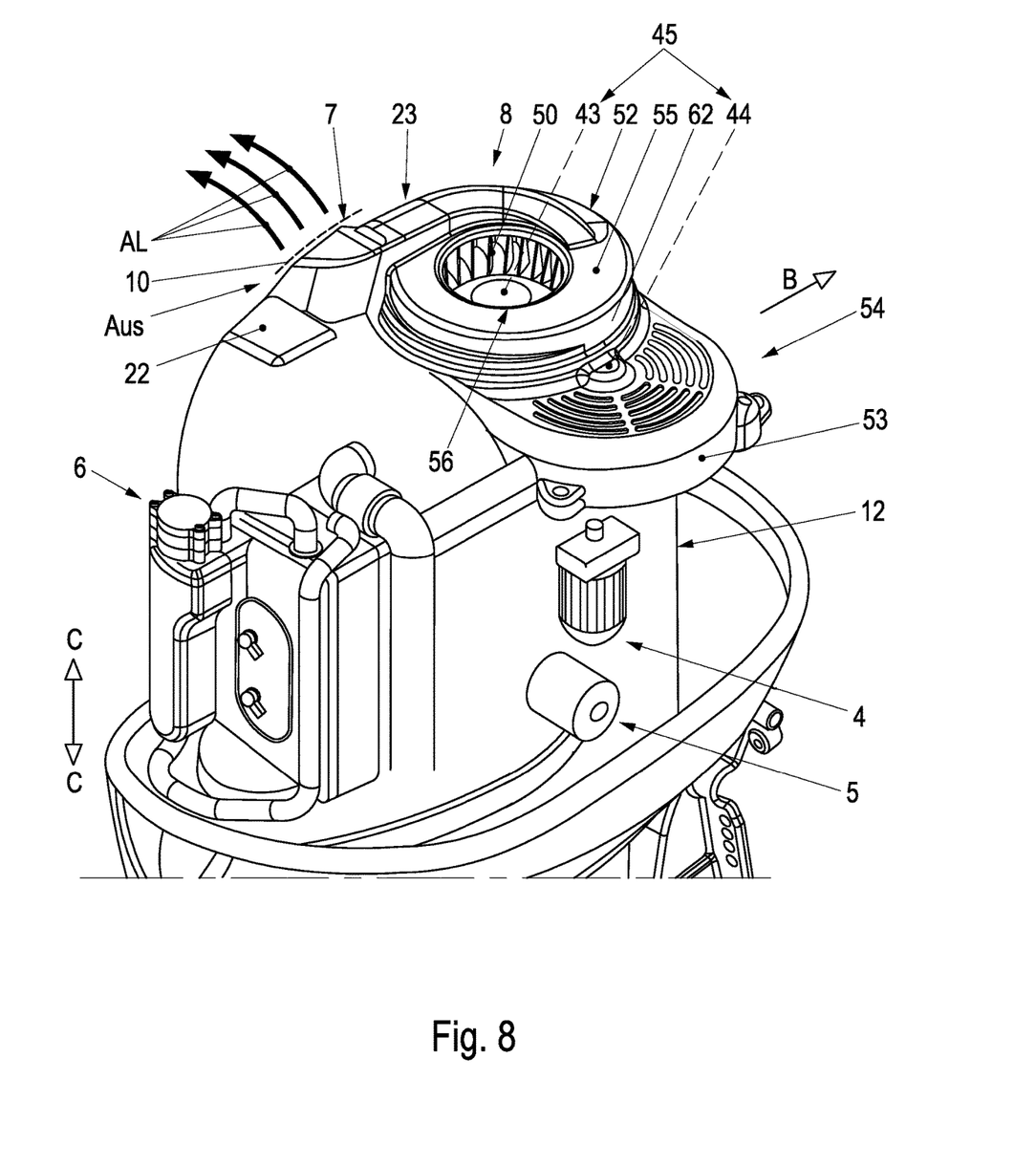
FIG. 8 is an oblique view from above the internal combustion engine with auxiliary units.

An outboard motor 1 comprises an internal combustion engine 2 for propelling a ship, having an air-guiding system 3, which is effective by way of a dome-like covering hood 7 surrounding surfaces of the internal combustion engine 2 and auxiliary units 4, 5, and 6—FIG. 8—(not explained in more detail) mounted on outer sides of the internal combustion engine 2. The air-guiding system 3 includes, on the one hand, a fan 8, which is driven by the internal combustion engine 2 and, on the other hand, an inlet opening 9 and outlet opening 10 in the covering hood 7, which dads the internal combustion engine 2 extensively and in a dome-like manner. Airflows Ls to be controlled enter via the inlet opening 9 into an interior 11 of the covering hood 7 and escape from this covering hood 7 by way of the outlet opening 10.

Figure 1:
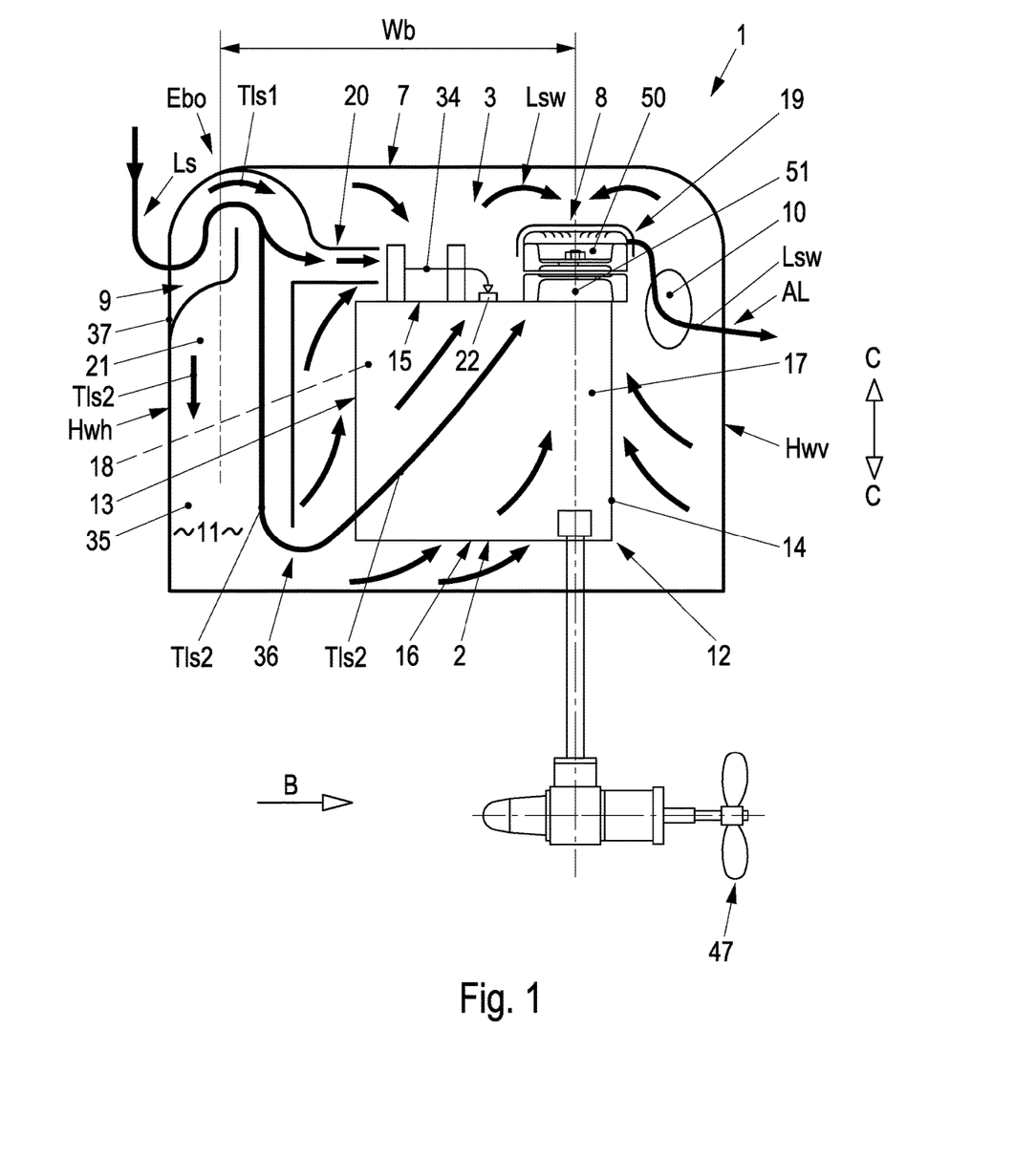
FIG. 1 is a schematic side view of an outboard motor having an internal combustion engine, a covering hood, and an air-guiding system.

The internal combustion engine 2 has a machine housing 12 which, as viewed in the direction of travel B, comprises a rear side 13, a front side 14 and, as viewed in the vertical direction C-C, an upper side 15 and a lower side 16, as well as a right longitudinal side 17, and a left longitudinal side 18. The auxiliary units 4, 5, and 6 are mounted on the latter two sides. Influenced by the fan 8, which has an impeller system 19 with mixed flow, radial flow, or the like, the air flows pass via the inlet opening 9 in the direction of the interior 11 of the covering hood 7. Adjacent to the inlet opening 9, i.e. in the interior 11, the airflows Ls are separated into first partial airflows Tls1 and second partial airflows Tls2, as shown in FIG. 1.

For this purpose, the air-guiding system 3 in the covering hood 7 comprises a first channeling device 20 for the first partial air flows Tls1 and a second channeling device 21 for the second partial air flows Tls2. The first partial air flows Tls1 are fed as intake air to an intake system 22 of the internal combustion engine 2, whereas the second partial air flows Tls2 act, through the effect of the fan 8, on the surfaces of the internal combustion engine 2 and of the auxiliary units 4, 5, and 6, which are heated by the operation of the internal combustion engine 2. Furthermore, the air flows Lsw heated by the surfaces of the internal combustion engine 2 and the auxiliary units 4, 5, and 6 are channeled by the fan 8 and a third channeling device 23 (FIG. 3) as exhaust air AL via the outlet opening 10 in the covering hood 7 to an outer side Aus of said covering hood 7 or into the atmosphere (FIG. 8).

Figure 3:
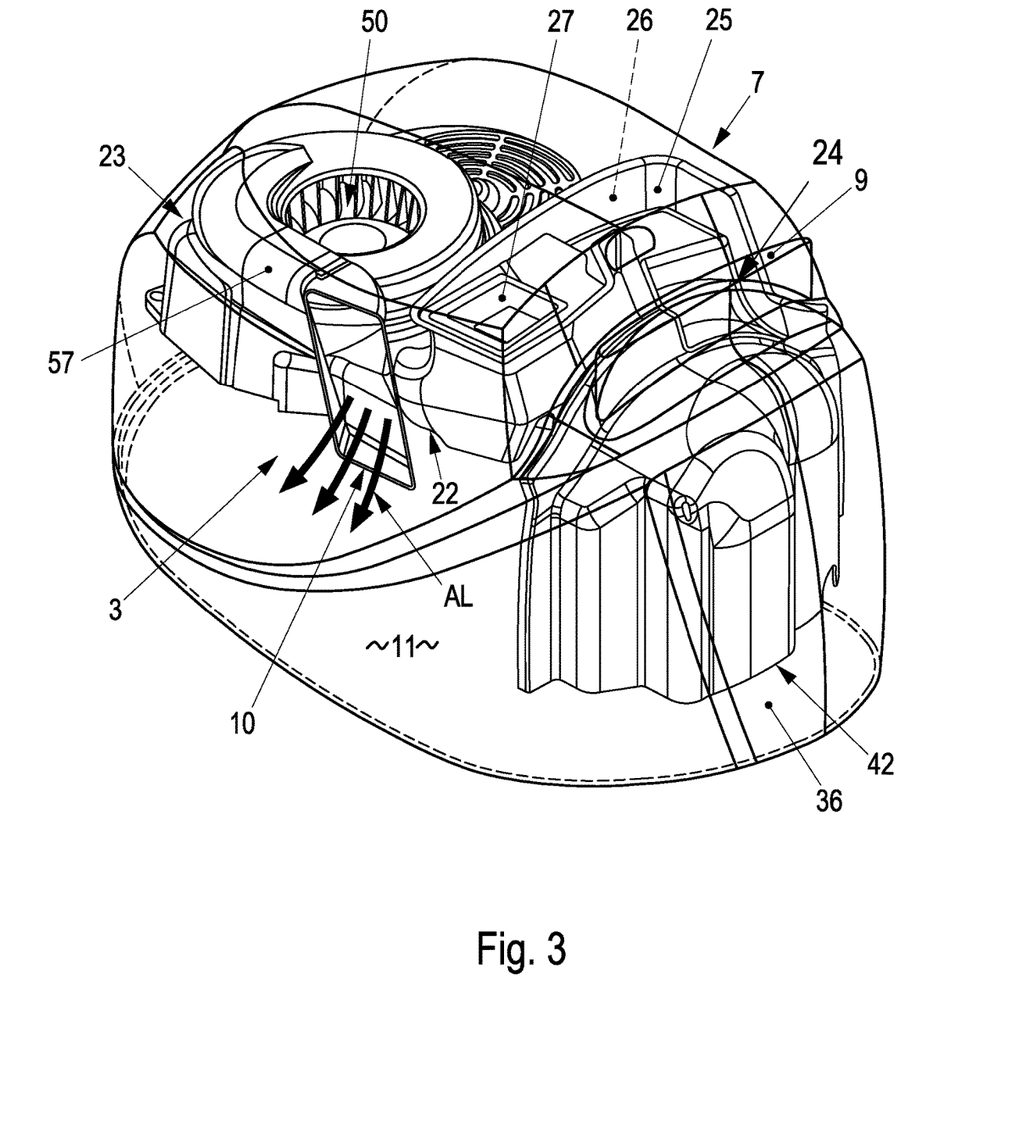
FIG. 3 is an oblique view from above the covering hood with parts of the air-guiding system according to FIG. 1 shown.
Figure 5:
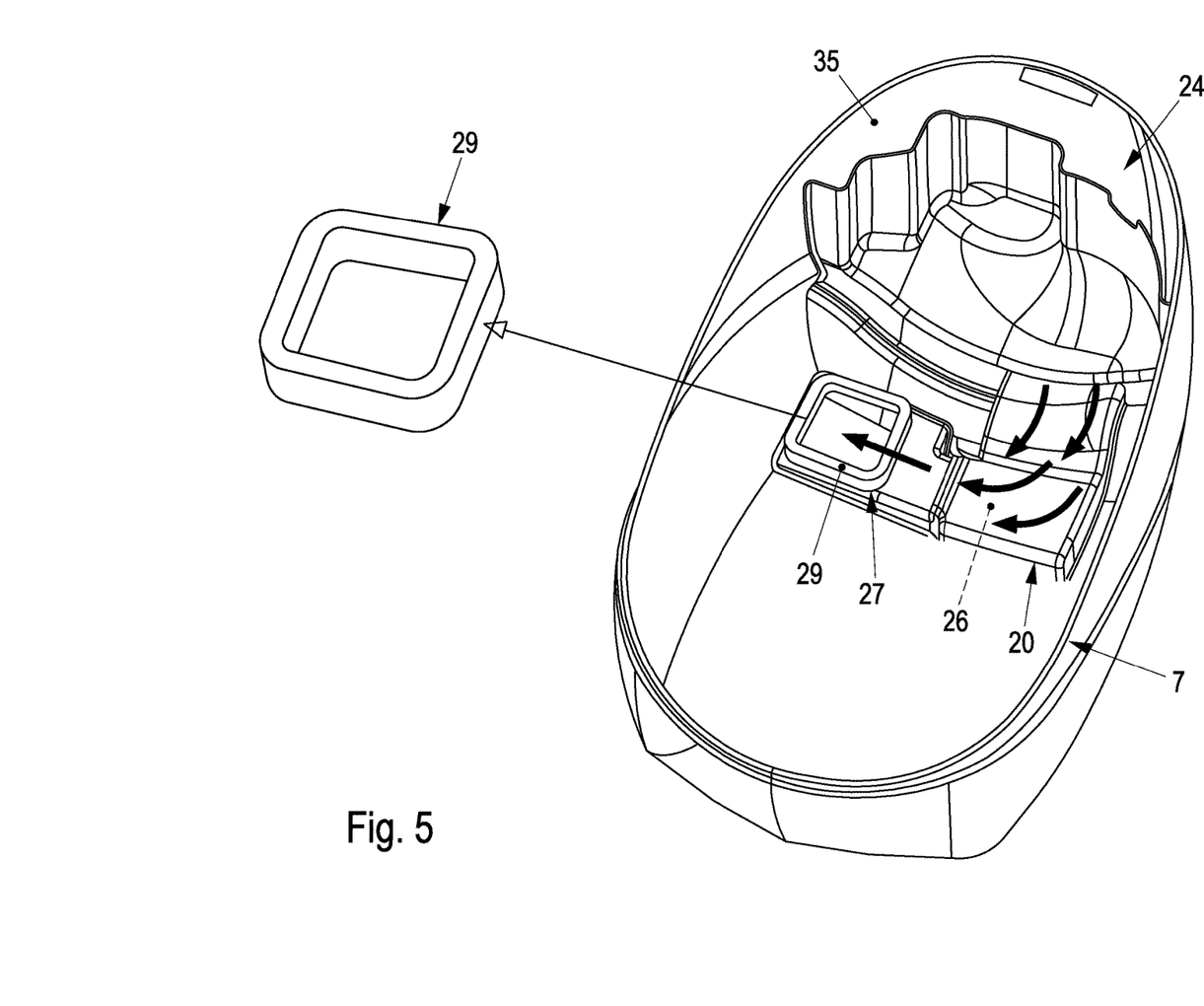
FIG. 5 is an oblique view from below into the covering hood, with parts of the air-guiding system according to FIGS. 1, 3, and 4 shown.
Figure 6:
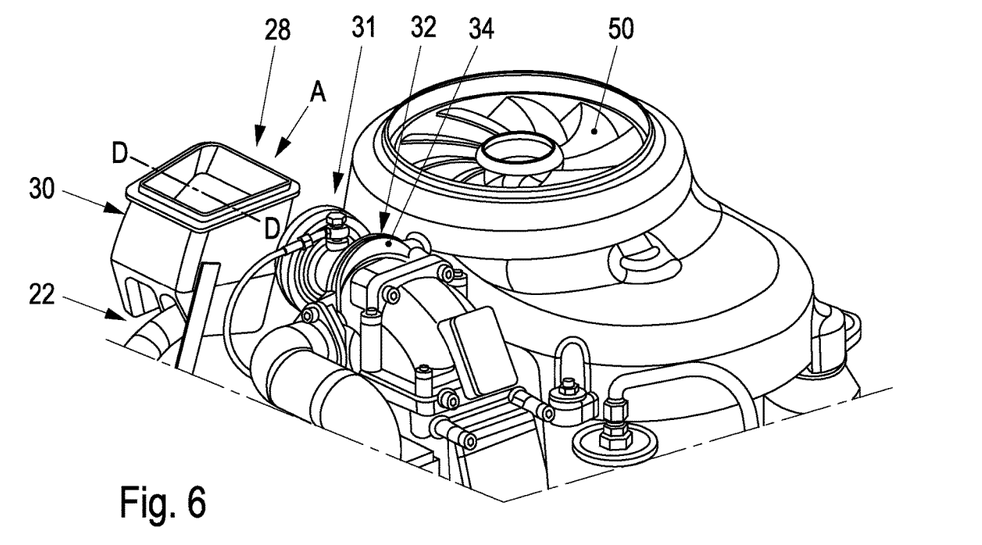
FIG. 6 is an oblique view of parts of the internal combustion engine with a fan of the air-guiding system.
Figure 7:
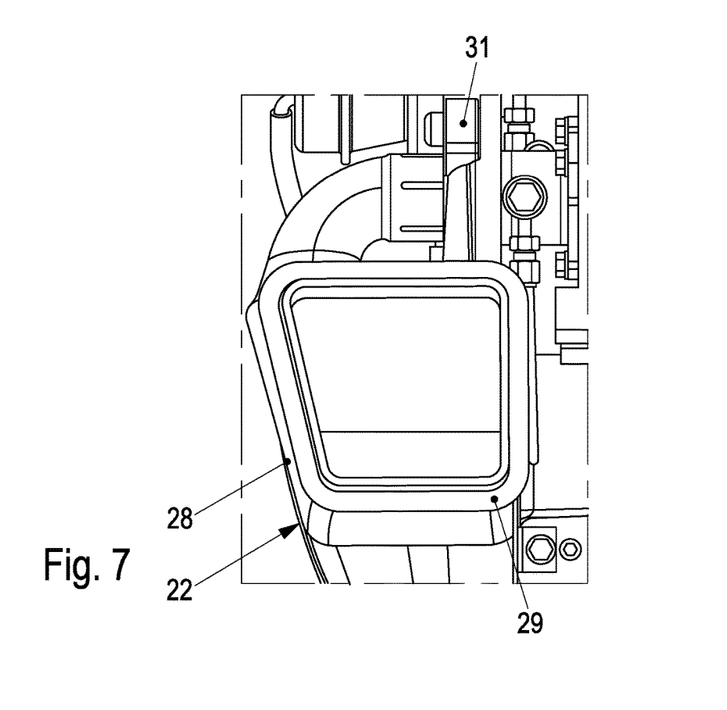
FIG. 7 is a view approximately in the direction of an arrow A in FIG. 6.

The inlet opening 9 is arranged on a rear vertical hood wall Hwv of an upper end region Ebo of the covering hood 7. In addition, the inlet opening 9 is adjoined by a distributing device or guide 24—FIGS. 3 and 4—by way of which the first partial air flows Tls1 and the second partial air flows Tls2 are guided into the first channeling device 20 and the second channeling device 21, respectively. The first channeling device 20 forms, with an upper hood wall portion 25 of the covering hood 7, a duct region 26 (FIG. 3). The latter is connected by an outlet region 27 (FIGS. 3 and 5), which is, for example, horizontally oriented and quadrangular, to a corresponding inlet region 28—FIGS. 6-7—toward the intake system 22.

Figure 4:
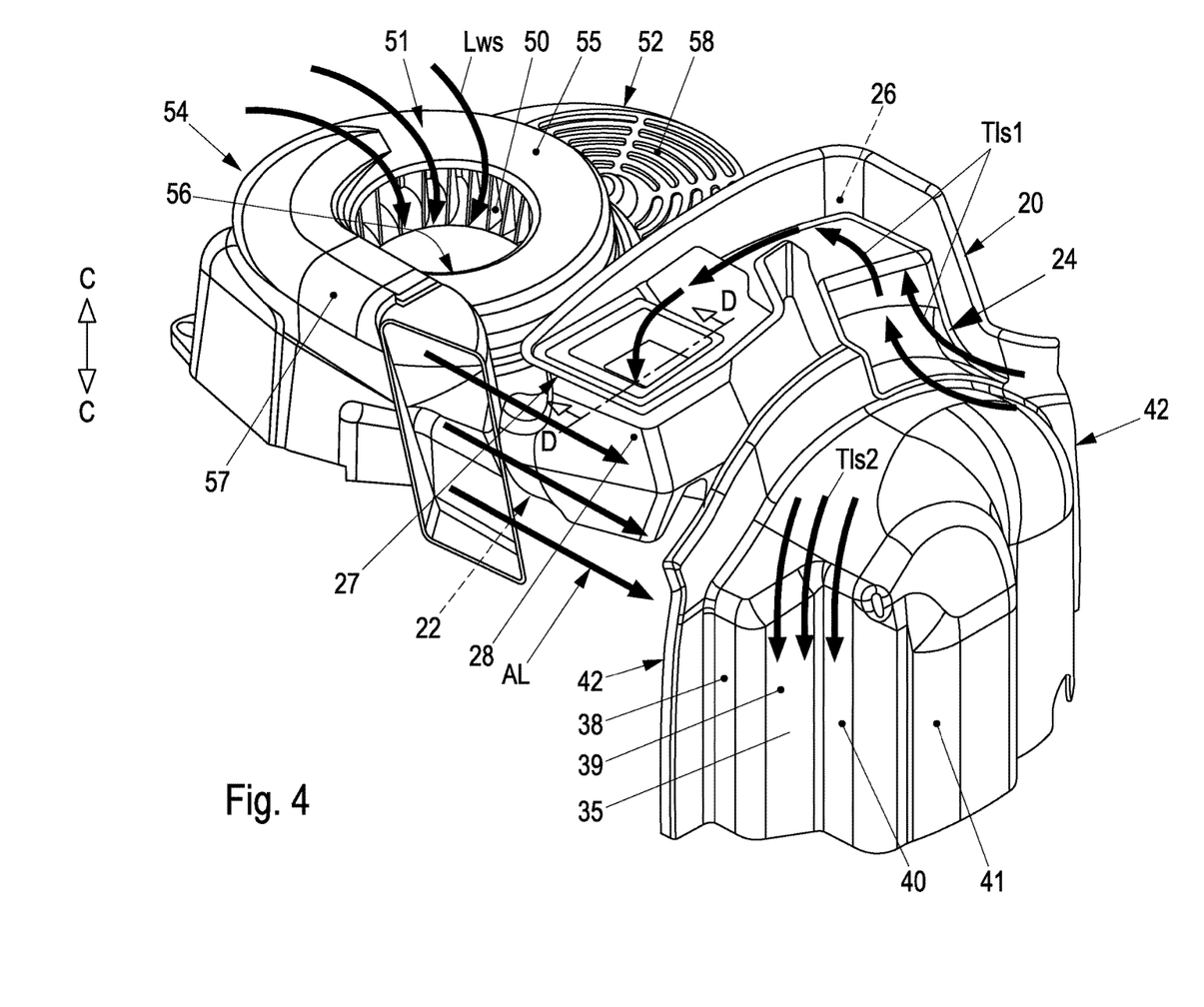
FIG. 4 is a view corresponding to FIG. 3, but without covering hood.

In order to open the covering hood 7 so as to allow access to the internal combustion engine 2, the outlet region 27 and the inlet region 28 can be separated in an approximately horizontal plane D-D (FIG. 4). A correspondingly adapted sealing body 29 (FIG. 5) is effective in this plane D-D, that is to say between the outlet region 27 and inlet region 28. The inlet region 28 is connected to a connecting tank 30 which is structurally combined with a compressor 31 of a turbocharger device 34 which is connected to the intake system 22 and provided with a turbine 32—FIGS. 3 and 6.

The second partial air flows Tls2 are channeled by means of a vertical duct 35 in the direction of the underside 16 of the internal combustion engine 2. From there, the second partial air flows Tls2 pass via an overflow region 36—FIG. 1—into the interior 11 of the covering hood 7, to be precise in such a way that the second partial air flows Tls2, with the aid of the fan 8, have a heat-reducing influence on the surfaces of the internal combustion engine 2 and of the auxiliary units. The duct 35 is formed, on the one hand, by a hood wall portion 37 of the vertical hood wall Hwh and, on the other hand, by boundary portions 38, 39, 40 and 41 (FIG. 4), which are arranged at an angle to one another, of an insert 42 of the covering hood. In the exemplary embodiment, the duct region 26 and the insert 42, which are moldings of plastic, for example, are connected to the covering hood 7—FIGS. 3 and 4—by adhesive bonding, screwing, or the like.

Figure 2:
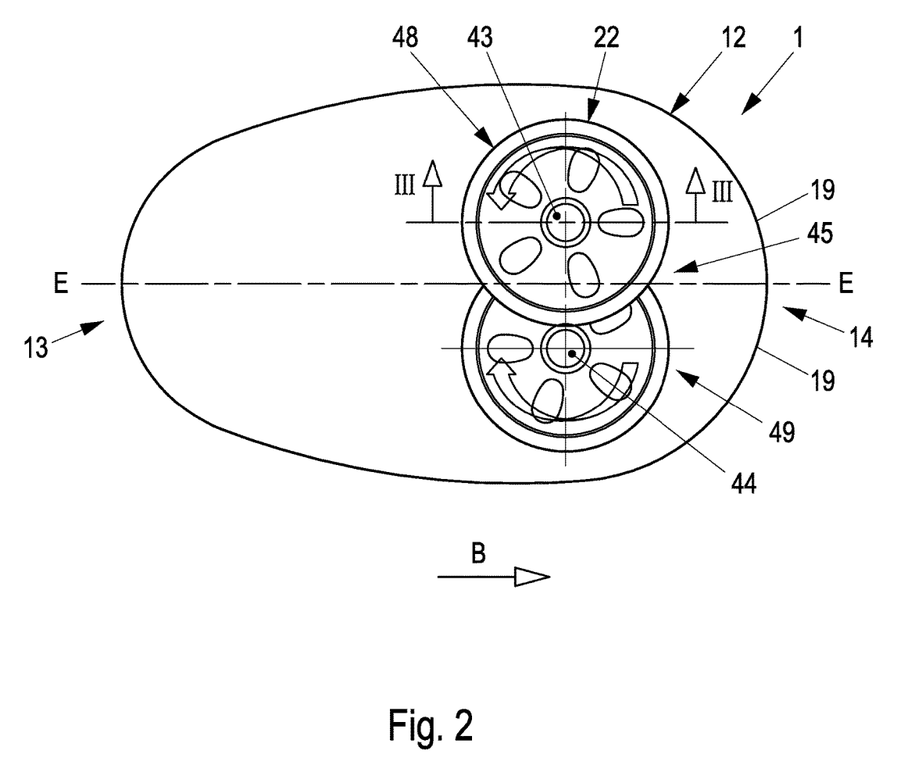
FIG. 2 is a schematic view from above of a crankshaft system of the internal combustion engine.

The internal combustion engine 2 of the reciprocating piston type has at least one reciprocating piston which is in operative connection by way of two connecting rods with two first and second crankshafts 43 and 44 (FIG. 2), which are oriented parallel to one another and rotate in opposite directions of rotation. The first and second crankshafts 43 and 44 of a crankshaft system 45—FIGS. 2 and 8—are relatively vertical to a water line (not shown) of the ship and drive a ship's propeller 47—FIG. 1—by way of a drive shaft 46 below a water line. The crankshafts 43 and 44 project beyond the upper side 15 of the internal combustion engine 1, are situated—as viewed transversely to the direction of travel B—next to one another symmetrically to a center longitudinal plane E-E—FIG. 2—of the internal combustion engine 2, and are provided at end regions with first and second flywheels 48 and 49 (FIGS. 1 and 2). As viewed in the vertical direction C-C, the first upper flywheel 48 and the second lower flywheel 49 are fastened offset to one another to the crankshafts 43 and 44, and the crankshafts mutually overlap in certain regions for space-saving reasons (FIG. 2). The first flywheel 48 is situated above the second flywheel 49, which first flywheel 48 bears and drives the fan 8 or an impeller 50—FIG. 3—of the impeller system 19 shown in FIG. 1. In addition, the first flywheel 48 and the fan 8 are structurally combined.

The internal combustion engine 2 accommodates the crankshafts 43 and 44 by way of the machine housing 12, and the internal combustion engine 2 operates, by a diesel injection process, the turbocharger device 34, with the compressor 31 and the turbine 32 being provided to optimize its operation. The turbocharger device 34 is connected to the intake system 22 of the internal combustion engine 2, which turbocharger device 34 and intake system 22 are arranged on the upper side 15 of the internal combustion engine 2 and, to be precise, not far from the rear hood wall Hwh, as viewed in the direction of travel B, of the covering hood 12. Further details of the internal combustion engine 2 are available from European publication EP 2 980 374 A1, which concerns a similar internal combustion engine.

The inlet opening 9 is provided on the rear hood wall Hwh, whereas the fan 8, which is in operative connection with the first crankshaft 43, is arranged, as viewed in the direction of travel B, close to a front vertical hood wall Hwv of the covering hood 7. By virtue of the spacing of the vertical duct 35 or the overflow region 36 of the second channeling device 21, situated adjacent to the underside, and a vertical axis of rotation 51 of the impeller 50 of the fan 8, there is obtained, as viewed in the direction of travel B, an effective region Wb, shown in FIG. 1. This has the effect that the partial air flows T1s act in a targeted manner on the surfaces of the internal combustion engine 2 and of the auxiliary units 4, 5, and 6.

The first upper flywheel 48 with the fan 8 and the second lower flywheel 49 are comprehensively covered by a first upper protective hood portion 54 and a second protective hood portion 52, respectively. The first protective hood portion 54 and the second protective hood portion 52 are formed as a housing-like fan-flywheel covering 53, which is produced from one piece or consists of a plurality of parts. Moreover, the first protective hood portion 54, which clads the fan 8, is provided on an upper side 55 with an inlet opening 56 for heated partial air flows Tlsw, and the hood portion 54 of the fan-flywheel covering 53 has a spiral tangential portion 57. The latter guides the exhaust air AL conveyed by the fan 8 via the outlet opening 10 to the outer side Aus of the covering hood 7. To vent the second protective hood portion 52, annular passage slots 58 are provided in a cover region.

Figure 9:
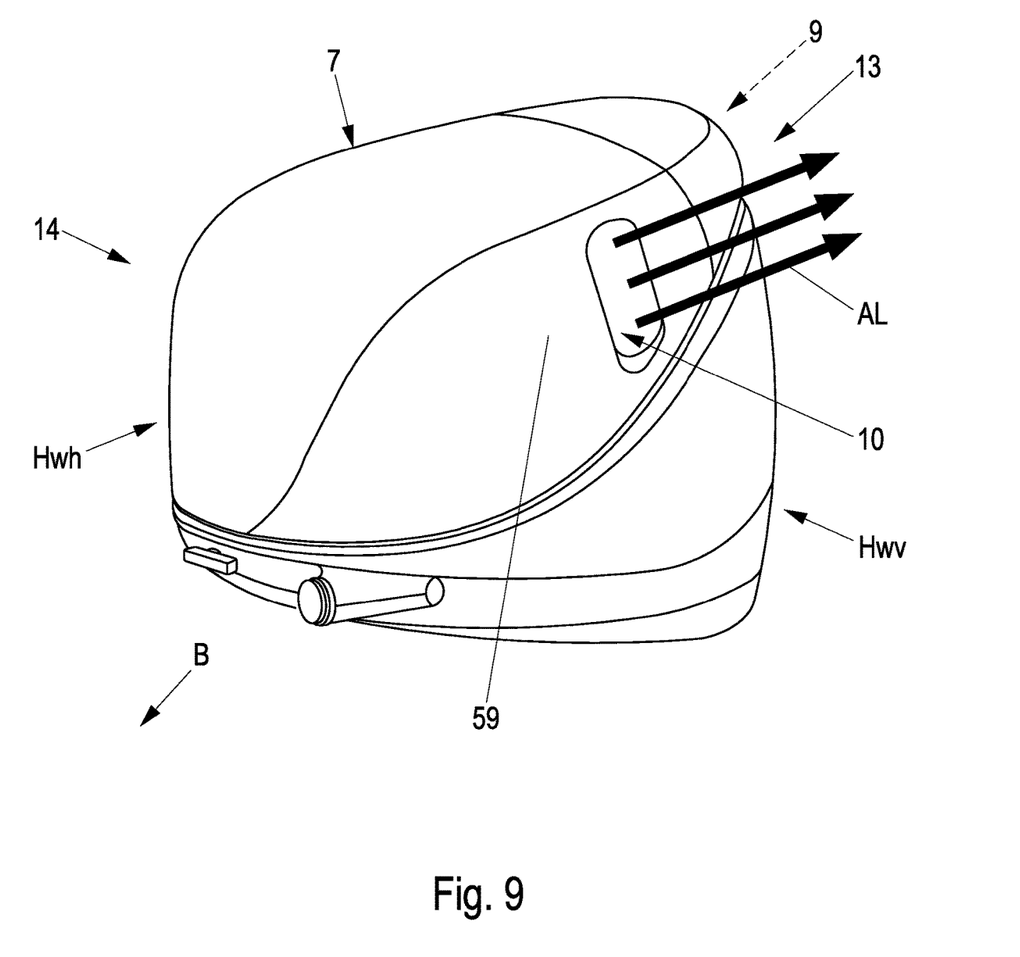
FIG. 9 is an oblique view from above the covering hood with an outlet opening.

Finally, FIG. 9 shows that the outlet opening 10 is provided on a left—as viewed in the direction of travel B—hood wall 59, from which there exits the exhaust air AL coming from the fan 8 or the tangential portion 57.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An outboard motor, comprising:
    an internal combustion engine for propelling a ship having an air-guiding system effective by way of a covering hood surrounding surfaces of the internal combustion engine and auxiliary units, the covering hood provided with an inlet opening and an outlet opening for airflows moving in an interior of the covering hood,
    a fan driven by the internal combustion engine at least partially influencing the airflows moving in the interior of the covering hood, wherein
    the airflows enter via an inlet opening in a direction of the interior of the covering hood and are separated adjacent to an inlet opening into first partial airflows and second partial airflows, the air-guiding system effective by way of the covering hood including a first channeling device for the first partial airflows and a second channeling device for the second partial airflows,
    the first partial airflows are fed as intake air to an intake system of the internal combustion engine, and the second partial airflows act, with aid from the fan, on the surfaces of the internal combustion engine and of the auxiliary units that are heated by operation of the internal combustion engine, and
    airflows heated by the surfaces of the internal combustion engine and the auxiliary units are conveyed by the fan and a third channeling device as exhaust air via the outlet opening in the covering hood to an outer side of said covering hood or into the atmosphere,
    wherein the inlet opening is arranged on a vertical hood wall adjacent to an upper end region of the covering hood, and the inlet opening is adjoined by a distributing guide in the covering hood, via which distributing guide the first partial airflows and the second partial airflows are guided into the first channeling device and the second channeling device, respectively, and
    wherein the first channeling device forms, with an upper hood wall portion of the covering hood, a duct region connected by an outlet region, horizontally oriented and quadrangular, to a corresponding inlet region toward the intake system.

2. The outboard motor as claimed in claim 1, wherein, in order to open the covering hood, the outlet region and the inlet region can be separated from one another, and said regions interact with one another by way of an interposed an annular sealing body.

3. The outboard motor as claimed in claim 2, wherein the inlet region is connected to a collecting tank that is structurally combined with a compressor of a turbocharger device connected to the intake system.

4. The outboard motor as claimed in claim 3, wherein the fan has an impeller system with a mixed flow or a radial flow.

5. The outboard motor as claimed in claim 2, wherein the second partial air flows are channeled by the second channeling device, comprising a vertical duct, in a direction of an underside of the internal combustion engine, and pass from there via an overflow region into the interior of the covering hood in such a way that the second partial air flows have a heat-removing influence on the surfaces of the internal combustion engine and the auxiliary units.

6. The outboard motor as claimed in claim 5, wherein the vertical duct is formed by a main wall portion of the vertical hood wall and by boundary portions of an insert of the covering hood.

7. The outboard motor as claimed in claim 6, wherein the duct region and the insert are connected to the covering hood by adhesive bonding or screwing.

8. The outboard motor as claimed in claim 5, wherein a first protective hood portion cladding the fan is provided with the third channeling device, which has an approximately spiral tangential duct portion of a fan-flywheel covering, and the tangential duct portion guides the exhaust air conveyed by the fan via the outlet opening to the outer side of the covering hood or into the atmosphere.

9. The outboard motor as claimed in claim 1, wherein the fan is driven by way of a vertical crankshaft projecting beyond an upper side of the internal combustion engine.

10. The outboard motor as claimed in claim 9, wherein, as viewed in a direction of travel of the ship, the inlet opening is arranged adjacent to a rear hood wall and the fan is arranged on the crankshaft close to a front hood wall.

11. The outboard motor as claimed in claim 9, wherein the crankshaft that drives the fan forms, together with a second crankshaft extending parallel to the first crankshaft, a crankshaft system of the internal combustion engine in which the first and second crankshafts are in operative connection with at least one reciprocating piston via two connecting rods.

12. The outboard motor as claimed in claim 11, wherein the crankshafts are arranged transversely to a direction of travel on both sides of a center longitudinal plane and have first and second flywheels at their upper ends projecting beyond the upper side, the flywheels, as viewed in a vertical direction, are arranged offset to one another and overlap one another in certain regions, the first flywheel is an upper flywheel and the second flywheel is a lower flywheel, and the fan is structurally combined with the first, upper flywheel.

13. The outboard motor as claimed in claim 12, wherein the first, upper flywheel with the fan and the second, lower flywheel are covered by a first upper protective foot portion and a lower second hood portion, respectively, which are formed as a fan-flywheel covering produced from one piece or consisting of a plurality of parts.

\* \* \* \* \*